Dec. 10, 1940.    C. N. O'DAY    2,224,312
PERMANENT OUTLET CONTROL DEVICE
Original Filed Jan. 17, 1935    4 Sheets-Sheet 1
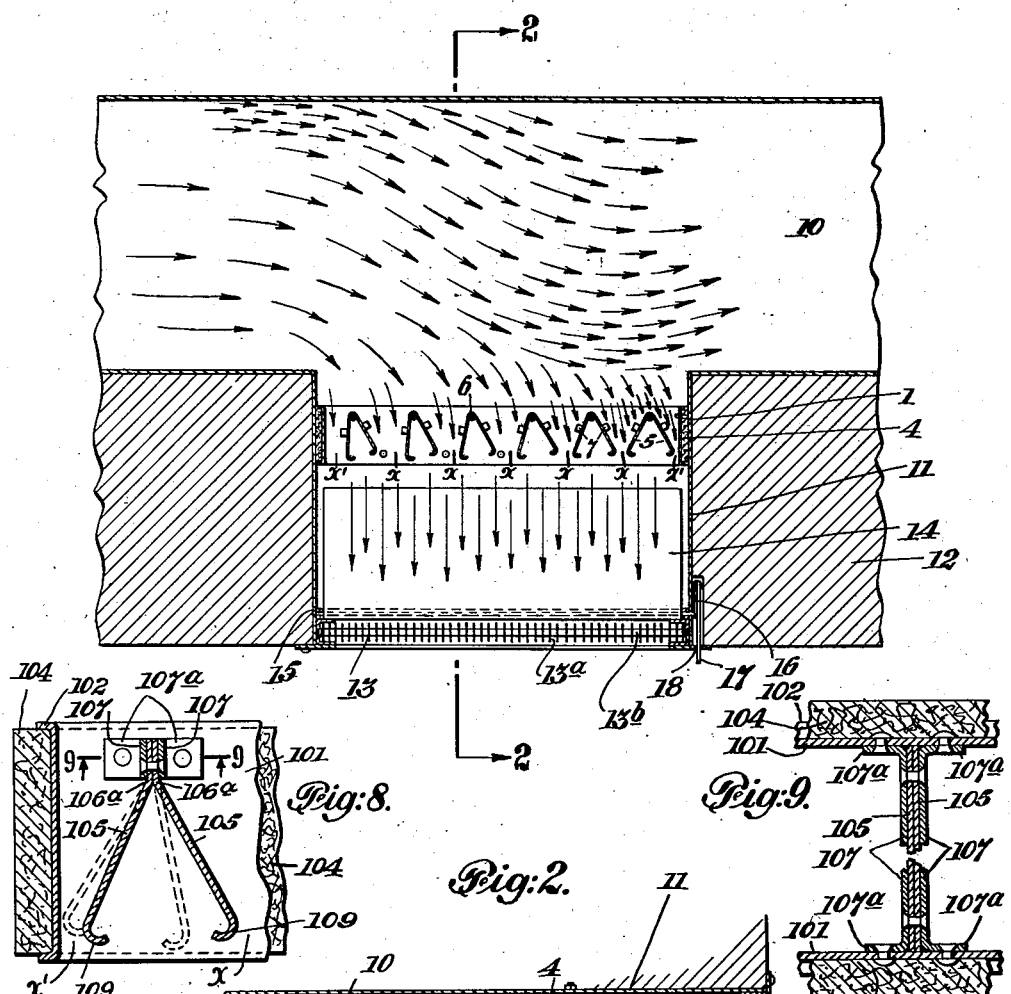

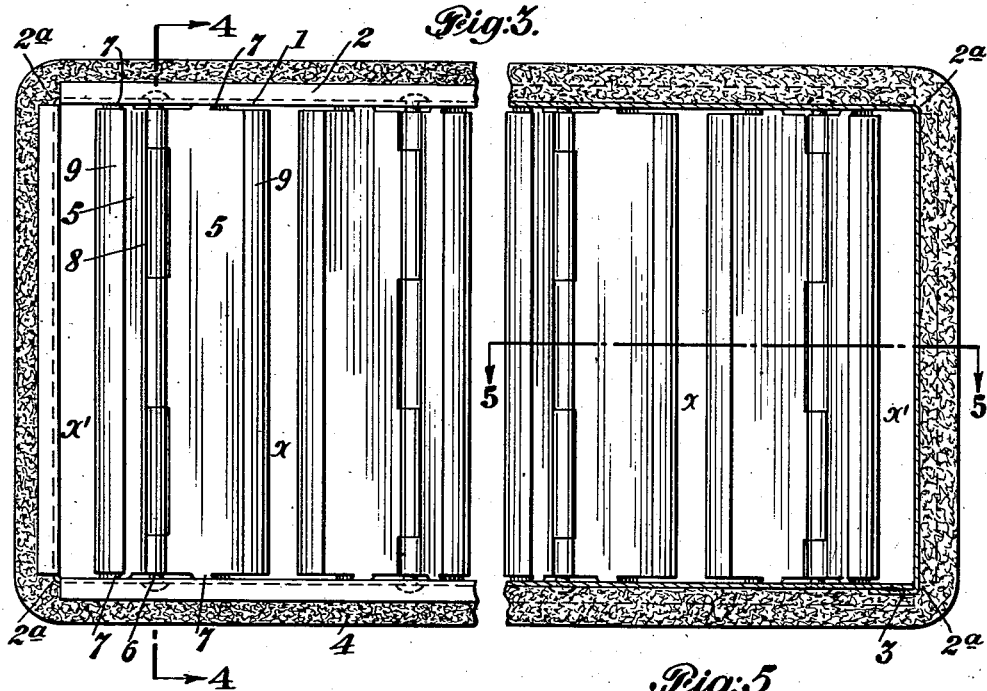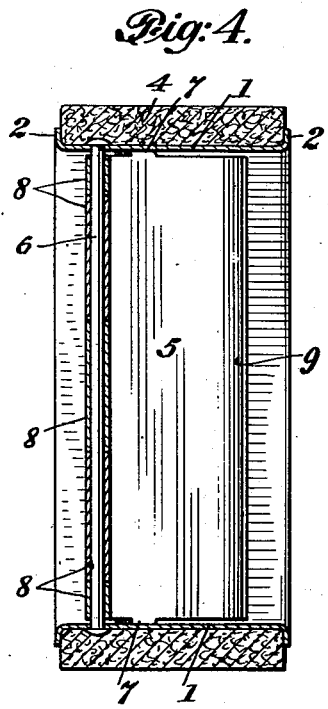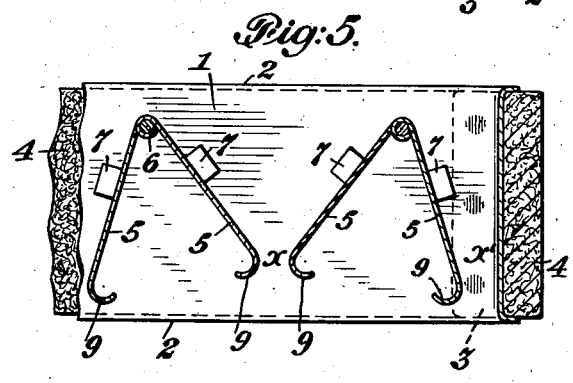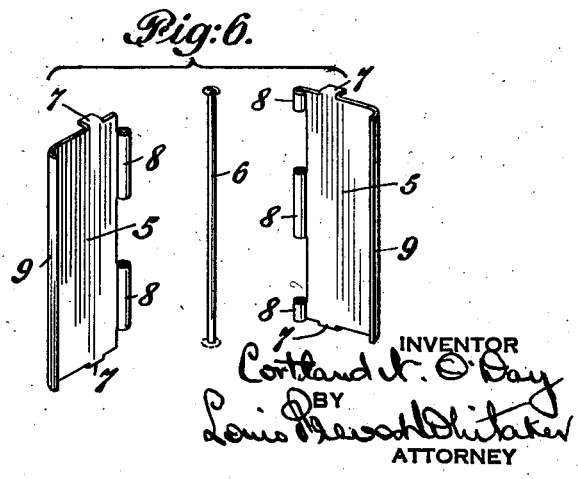

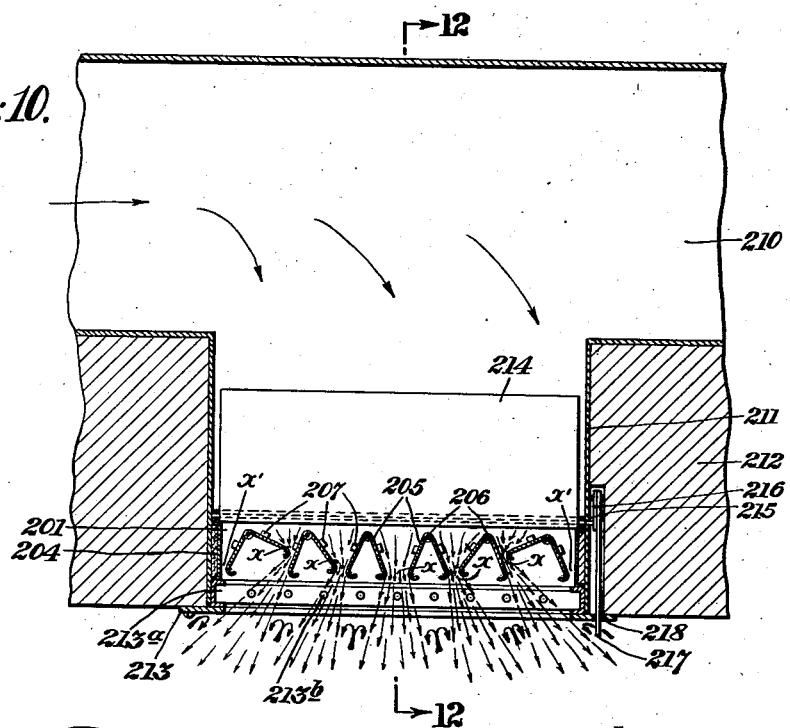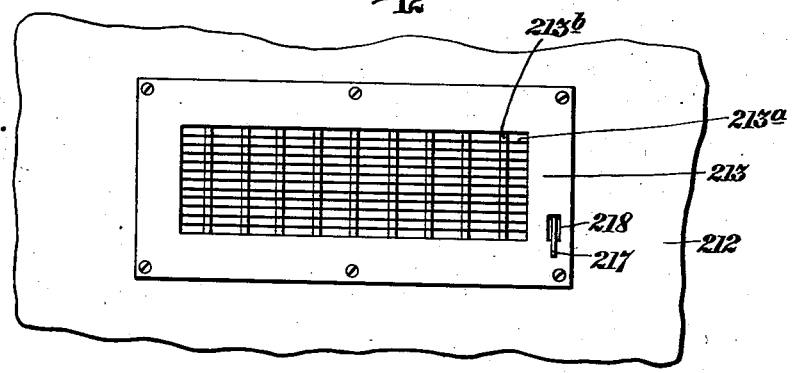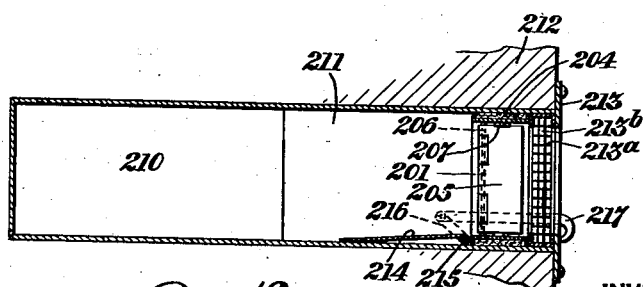

Dec. 10, 1940.  C. N. O'DAY  2,224,312
PERMANENT OUTLET CONTROL DEVICE
Original Filed Jan. 17, 1935   4 Sheets-Sheet 4
Fig. 13.
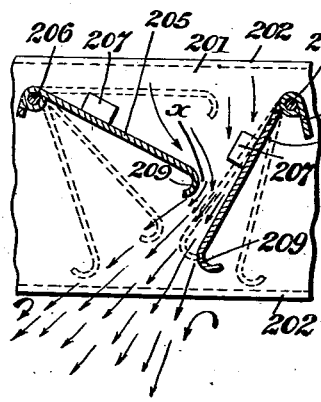
Fig. 14.
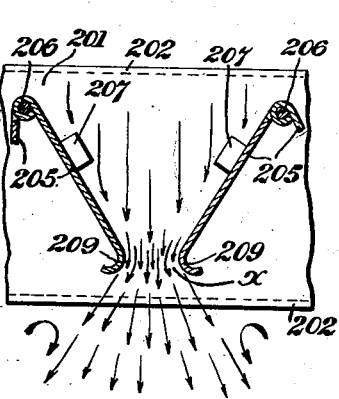
Fig. 15.
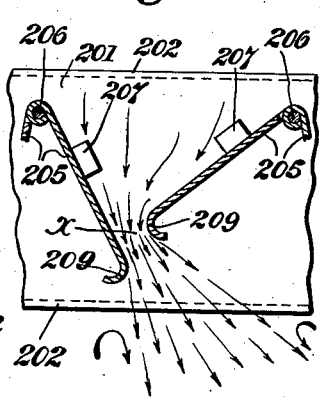
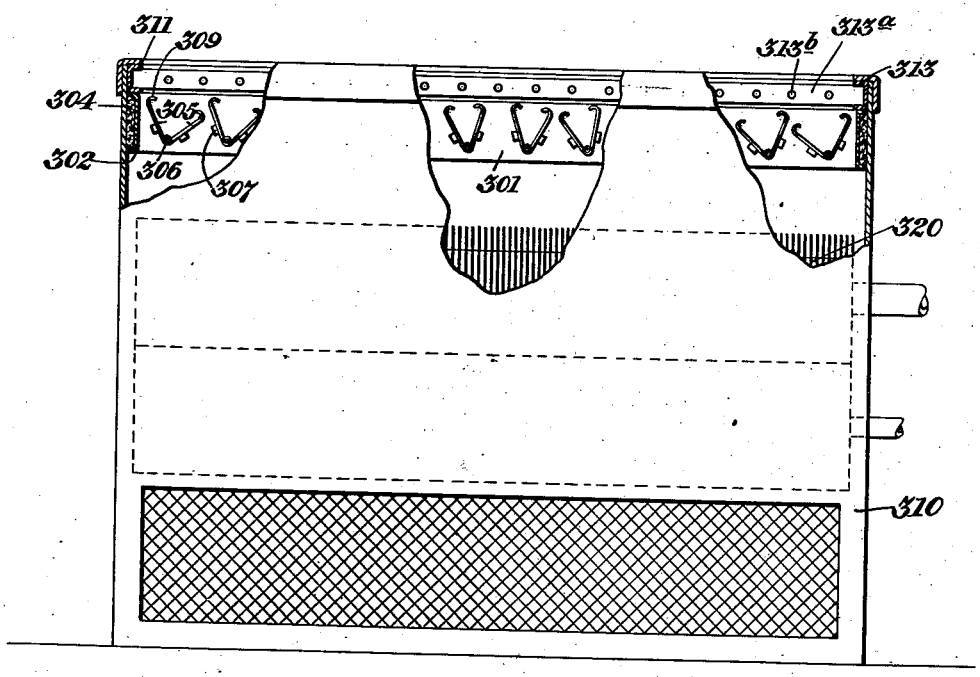
Fig. 16.
INVENTOR
Cortland N. O'Day
BY
Louis Prevost Whitaker
ATTORNEY Patented Dec. 10, 1940

2,224,312

UNITED STATES PATENT OFFICE 2,224,312

PERMANENT OUTLET CONTROL DEVICE

Cortland N. O'Day, Port Washington, N. Y., assignor to Preferred Utilities Company, Inc., New York, N. Y., a corporation of Delaware Application January 17, 1935, Serial No. 2,139
Renewed October 24, 1938

15 Claims. (Cl. 98—110)

My invention consists in the novel features hereinafter described, reference being had to the accompanying drawings, which illustrate an embodiment of my invention and certain modifications thereof, selected by me for purposes of illustration, and my said invention is fully disclosed in the following description and claims.

In the construction and operation of duct systems having multiple outlets for conveying air to various parts of a building, as for heating, cooling or ventilating purposes, a serious problem is presented in securing the desired flow from each of the outlets as to volume, velocity and direction, which is necessary to keep the system properly balanced at all times. Efforts to solve this problem have included the use of splitter plates or dampers in the ducts in an effort to divide the stream flowing therethrough and direct a desired proportion to each particular outlet, and the use of adjustably connected register vanes, in or immediately in rear of the grille which usually covers the outlet, said vanes being connected by means for simultaneous and similarly adjusting the vanes to close the apertures between them to a greater or less extent. Splitter plates and such dampers are difficult to install and unsatisfactory in action, as they do not accomplish the desired result, and in addition to increasing the noise factor they cause turbulation of the air on both sides, and a vacuum space on one side, and unless placed at a great distance from the point of discharge cause the larger part of the air to be discharged through a portion only of the grille, usually at one side, at the bottom or at the top. The use of connected adjustable vanes is also open to serious objections. The adjustment of the vanes usually deflects the air from the outlet in different directions, according to their adjusted positions, and the simultaneous closing or opening of the spaces between the vanes of any outlet, usually by a device readily accessible from the outer side of the grille, continually changes the volume and velocity of the air delivered at that outlet, and frequently affects the volume and velocity of discharge at other outlets, with the result that a proper balance of any system, even if attained when the apparatus is initially adjusted cannot be maintained.

The object of my invention is to provide a control device for dividing the air or other gaseous fluid delivered from an outlet into a plurality of separated streams and individually and independently determining the volume, velocity and direction of each stream, said device being capable of initial adjustment when installed, but being maintained permanently in its adjusted position, unless some radical change of conditions makes another initial adjustment necessary or desirable. My invention is especially adapted to the outlets of duct systems, but it may be also used advantageously in outlets of individual units delivering air or other gaseous material, such as units for cooling, heating and controlling the moisture content, or otherwise conditioning air or other gaseous fluid.

In its simplest form my invention comprises a plurality of vanes extending across the discharge outlet, said vanes being individually and independently adjustable angularly with respect to the longitudinal axis of the outlet and with respect to each other, and being held permanently in their individually and independently adjustable positions. The vanes are preferably arranged in pairs, the vanes of each pair having their inner edge portions in close proximity to each other and positively supported in the outlet, or in a suitable frame fitting said outlet, and their outer portions diverging from each other and capable of being individually and independently adjusted to desired angular positions, and permanently held in adjusted positions. The effect of this construction is to provide separated discharge openings between the inner edge portions of adjacent vanes of contiguous pairs, which converge toward each other in the direction of flow, and thus tend to increase the velocity of the separated streams passing between them, in accordance with the independent adjustments of the individual vanes, said separate streams may also be directed in the same or different directions, as may be found desirable. The vanes may be rigidly secured at their inner edges to the walls of the outlet or to a frame, and by making them of metal sufficiently soft to permit them to be independently bent, they may be adjusted by bending, to bring the vanes into the desired angular positions, or the vanes may be mounted pivotally at or adjacent to their inner edges on common or contiguous pivots, in which case they may be independently adjusted on their pivotal supports, suitable means being provided to hold them permanently in their individually and independently adjusted positions. For convenience of manufacture and installation, I prefer to mount these individually and permanently adjustable vanes in a frame which is adapted to fit the particular outlet for which it is designed and to accommodate the slight variations in the interior surfaces of the outlet the frame is preferably surrounded by a yielding or elastic packing, such as felt or any other suitable material. I can thus prepare the frames for the various sizes of outlets, mount the vanes therein, and force the device into the outlet, where it will be securely held by friction. The vanes can be individually and permanently adjusted under actual working conditions by the aid of an anemometer for example, to secure the discharge of the desired volume of air at the desired velocity, and in the desired direction required at that point. Thereafter the usual grille may be applied to the outlet if desired, for the sake of appearance and to prevent the regulating device from being tampered with by unauthorized persons. Where it is desired, a supplemental damper of any usual or preferred type for either entirely closing the outlet or leaving it entirely open, may be installed in connection with the grille, but this will not in any way affect the adjustment of the outlet control device, which of course will be merely inoperative when the outlet is closed by the damper.

Where it is desired to obtain a substantially uniform flow over the entire outer end of the outlet, while controlling the volume and direction, my improved control device is preferably located at such distance back from the outer end of the outlet as will permit the separate streams issuing between the adjacent vanes of contiguous pairs to expand and commingle and lose their initial velocity within the confines of the outlet, so as to insure this result. If, on the other hand, this is not desired my improved control device may be employed at or near the discharge aperture of the outlet, so that the separated streams will be discharged at high velocity into the room or space with which the outlet communicates. In such case the separated high velocity streams have an aspirating or injector effect, tending to draw the air within the room or space into the low velocity or dead spaces between the high velocity streams, and projecting it therewith into the room or space, so as to rapidly and efficiently commingle the air or gaseous fluid, issuing from the outlet, with all portions of the air or gaseous material within the room or space.

It will also be understood that where the control device is employed at or close to the delivery aperture of the outlet, the vanes may be so independently and individually adjusted as to throw the separated streams of air not only outwardly but laterally in both directions where desired, to effect the widest possible distribution of the inflowing air or gaseous material, while at the same time and under all circumstances controlling the volume, velocity and direction of the individual streams. In such case, where wide distribution of the aspirating streams is desired, the grille if used will be provided with fins or blades disposed at right angles to the vane of the control device so as to facilitate the lateral spreading of the streams.

My invention also comprises certain novel features of construction and combination of parts hereinafter described and particularly pointed out in the claims.

Referring to the accompanying drawings,

Fig. 1 represents a horizontal, sectional view illustrating a portion of a duct with an outlet therefrom extending to the inner face of a wall, the outlet being provided with my improved permanent control device.

Fig. 2 represents a vertical section on the line 2—2 of Fig. 1.

Fig. 3 is an enlarged elevation of the control device, detached, the central portion being broken away.

Fig. 4 is a vertical section on line 4—4 of Fig. 3.

Fig. 5 is a horizontal section on line 5—5 of Fig. 3.

Fig. 6 is a detail view showing a pair of hinged vanes and the pivotal support therefor, detached.

Fig. 7 is a partial horizontal section of the control device illustrating a slight modification.

Fig. 8 is a horizontal sectional view similar to Fig. 7 showing a modification in which the vanes are rigidly supported at their inner edges and are bent into the desired adjusted positions.

Fig. 9 is a vertical section (partly broken away) on line 9—9 of Fig. 8.

Fig. 10 is a view similar to Fig. 1, except that the control device is located closely adjacent to the outer or discharge end of the outlet, so as to produce the aspirating effect of the individual streams.

Fig. 11 represents a front elevation of the device shown in Fig. 10.

Fig. 12 represents a vertical section on line 12—12 of Fig. 10.

Fig. 13 is a partial horizontal section of a controlling device showing the vanes set in position to discharge a stream of air at high velocity angularly thereto, and illustrating in dotted lines various adjustments of adjacent vanes.

Fig. 14 is a view similar to Fig. 13, showing adjacent vanes adjusted to discharge a stream of air substantially perpendicularly to the plane of the control device.

Fig. 15 is a similar view, showing adjacent vanes adjusted to discharge a current of air laterally and in the opposite direction from the arrangement illustrated in Fig. 13.

Fig. 16 is a front elevation, partly in section, showing an individual unit of the so-called cabinet type having my invention embodied therein.

In the embodiment of my invention shown in Figs. 1 to 9, 1 represents a metallic frame conforming to the shape and form of the duct outlet in which it is to be used. It is preferably oblong in shape, as that is the cross sectional shape of such outlets, and is preferably formed of channel iron of suitable gauge, provided at each edge with a retaining flange 2. The retaining flange is conveniently severed at the proper points, as indicated at 2a, to permit the channel iron to be bent to form a frame of the desired dimensions as to length and height, so that the frame can be formed of one piece and provided with overlapping portions, indicated at 3 in Fig. 3, for example, which may be secured together in any desired manner, as by riveting, brazing or soldering, for example. I do not, however, limit myself to the formation of the frame in this particular manner, although it has proven convenient and economic in manufacture. The width of the frame members between the flanges 2 will be preferably slightly greater than the corresponding dimensions of the vanes, hereinafter described, although this is not essential. For convenience of installation I prefer to make the exterior dimensions of the frame slightly less than the side of the dimensions of the outlet, and to provide the exterior of the frame with a packing 4, which may conveniently consist of a piece of felt extending entirely around the frame so that the exterior dimensions of the packing are slightly greater than the sides of the outlet. This enables the device to be readily inserted in the outlet at the desired distance from the front edge of the outlet and maintained permanently therein by the frictional contact between the packing and the walls of the outlet. Obviously other known compressible or elastic packing material could be used in place of the felt.

Between opposite parallel portions of the frame I provide a plurality of independently adjustable vanes, 5, capable of being independently set in their initial adjustments at any desired angle with respect to each other, or to the frame members with which they are connected, and provided with means for holding them permanently in their independently adjusted position. The vanes, 5, are preferably arranged in pairs and are pivoted in the frame adjacent to the inner edge thereof, either upon a common pivot, 6, as indicated in Figs. 1 to 6 inclusive, or upon closely adjacent pivots, 6a, 6a, as indicated in Fig. 7. Each of the vanes, 5, is of a length approximately equal to the distance between the parallel members of the frame, 1, and is provided preferably at each end with a friction flange, 7, for frictionally engaging the inner surface of the adjacent frame member with sufficient force to permanently hold the vane in its independently adjusted position. My invention is not limited to the use of these friction flanges for holding the vanes permanently in their adjusted position. It contemplates the use of any means for positively or frictionally holding the vanes securely in their adjusted positions, but in practice I have found the friction flanges herein described entirely satisfactory, and they are obviously the simplest and cheapest means for accomplishing this result. The vanes, 5, are formed of sheet metal, which preferably has sufficient resilience so that the friction flanges, 7, which are bent substantially perpendicularly to the vanes, will be pressed yieldingly into frictional contact with the inner surface of the adjacent frame member with the desired force, so as to hold the vanes rigidly and permanently in their adjusted positions. Each vane is conveniently provided at its inner edge with hinge members, indicated at 8, to engage its supporting pivot pin, 6, or 6a, and where the members of each pair of vanes are connected with a single pivot, the hinge members, 8, of one vane will be staggered with respect to those of the other vane, as clearly indicated in Fig. 6. The vanes of each pair are further provided at their outer extremities with a curved portion, indicated at 9, the curved portions of each vane extending in a direction toward the other vane of the pair, as clearly shown in the drawings. This construction tends to prevent eddying of the air currents passing through the delivery apertures which, as clearly shown for example in Figs. 1, 5 and 7, at X, are located between the outer ends of vanes of adjacent pairs or at each end of the series between the end vane and the adjacent perpendicular frame member, as indicated at X', in Figs. 1, 5 and 7. The pivot pins, 6 or 6a, may be secured in the frame in any desired manner. As shown in Fig. 6 they are provided at one end with a head, are passed through suitable apertures in the opposed parallel frame members and through the hinge members of the vanes, and may be riveted at the opposite ends, as indicated in dotted lines in Fig. 6.

In Fig. 1, I have shown a main duct, indicated at 10, which may be a portion of a duct system extending through a building in any usual or desired manner and provided with a plurality of branch ducts or outlets into a room, or rooms, one of which outlets is indicated at 11, as extending in the usual manner through the inner portion of the wall, 12, of the room or building, and provided at its outlet end with any usual form of grille, indicated at 13, and composed in this instance of blades or fins, 13a, and supporting rods, 13b, which may be supported in any usual or preferred manner so as to extend across the opening at the outer end of the outlet, and secured either to the wall of the outlet or to the face of the room wall, as may be desired. In Fig. 1, I have shown my improved permanent outlet control device mounted in the outlet, 11, at a distance back from the outer end where the grille is located.

It will be understood that a current of air, which may be warm air for heating, cool air for cooling, or clean outside air for ventilating purposes, is forced through the duct system including the duct, 10, for delivery in proper proportion to the several outlets. This air does not flow absolutely uniformly through the ducts, but may follow more or less varying lines of direction as it passes therethrough, due to changes of direction of the duct or to the proximity to outlets, or for other reasons, and I have indicated this condition for purposes of illustration, by means of arrows in the duct, 10, Fig. 1. As thus indicated, there is a tendency due to the angular relation of the main and branch ducts, for greater quantities of air per unit area to flow through the far side of the inlet to the branch duct. On the other hand, it is necessary and desirable that the quantity of air passing out through the several outlets shall be properly regulated so that as the air passes through the grille, it will pass in substantially uniform direction parallel to the axis of the outlet and in the volume desired at each outlet, in accordance with the capacity and design of the entire duct system. In order to secure this result, after the installation of the control device in the manner previously described, it is necessary for a skilled operator to adjust the vanes, 5, in situ, in accordance with the peculiarities present at the particular outlet. To provide for uniform distribution of the air flow laterally of the branch duct, the vanes would ordinarily be set as shown in Fig. 1 with the passages X, X' on the far side of the duct narrower than those on the near side. Setting of the vanes to produce a uniform velocity over the entire grille face may be accomplished with the aid of an instrument of precision designed for the purpose, for example, an ordinary anemometer can be successfully used for the purpose, by holding it in front of the discharge end of the outlet and changing the position of the vanes individually and independently of each other so as to form the orifices, X, X', of the proper width, and also so as to correlate the opposed vanes at each side of the orifice, X, X', which will ordinarily converge from the pivotal supports toward the orifices, that any eccentricities of direction due to eddies in the duct, 10, will also be corrected. In other words, the adjacent vane of contiguous pairs between the outer ends of which the delivery openings are formed, are individually and independently adjusted with respect to each other, so as to control the volume, direction and velocity of flow therethrough. In the ordinary independent adjustments of the vanes, 5, they will as above stated, usually converge to a greater or less extent from their points of pivoting toward the orifices, X, X', which of course tends to compress the individual currents of air passing outwardly between said converging vanes to a greater or less extent according to the width of the aperture, and this will correspondingly increase the velocity of such individual currents. As soon as these separate air currents have passed outwardly beyond the vanes, however, they will expand and merge with loss of velocity, so that by the proper adjustment of the vanes, the desired quantity of air can be uniformly discharged from the outlet at the desired velocity and in the desired direction. Obviously this adjustment of the vanes will be made before the grille is applied to the outer end of the outlet, and this is a permanent adjustment in situ as the vanes will each be held in the particular position with respect to the other vanes, and the frame to which it may be individually moved, by the friction flanges previously described, or any other suitable retaining means. It is also to be clearly understood that the vanes on opposite sides of the openings, X, may not only be spaced differently, but may occupy any desired angular relation to each other that may be necessitated by the conditions in the duct, 10, to correct irregularities of volume, direction or velocity at such points, to the end that the flow of air through the outlet, 11, and its delivery therefrom shall be and remain substantially uniform throughout the outlet. After the control device is adjusted, the grille will be placed over the aperture, and no further change in the adjustments of the vanes or any of them is contemplated, and no such adjustment could be made without the removal of the grille. It is possible that, due to changes in or extensions in the duct system, a readjustment of the control device might at some time be or become necessary, but otherwise, the vanes remain permanently in their adjusted positions, and as a matter of fact, the oxidation or corrosion or rusting of the contacting faces of the flanges, 7, and the inner surfaces of the frame members assists in permanently holding the vanes in their adjusted positions.

In Figs. 8 and 9 I have shown a slight modification of my invention, in which the vanes are constructed of sheet metal (or other suitable material sufficiently soft or flexible to permit it to be bent by the hand of an operator) the pairs of vanes having their inner edges rigidly secured in position in the frame so that the adjustment of the vanes to different angular positions can be effected by bending the vanes without the use of pivotal supports. In these figures the corresponding parts are given the same reference numerals with the addition of 100.

Thus, the vanes of each pair, indicated at 105, 105, have their inner edge portions arranged parallel to each other and secured, as by rivets or otherwise, to a vertical clamping strip, 107, or clamped between two of such strips, as shown. The opposite ends of the strips are bent angularly to form attaching flanges, 107a, which are permanently secured to the opposite frame members, 101. In the figures mentioned, I have shown the inner edges of the blades riveted between the vertical clamping strips, 107, and the flanges, 107a, riveted to the frame, but it is to be understood that they may be secured in other ways if found desirable.

In this construction it will be seen with reference to Fig. 8 particularly, that the vanes, 105, can be individually and independently adjusted with respect to each other and to the frame, as indicated by dotted lines, for example, each blade bending at the part marked, 106a, which forms the equivalent of a pivot or hinge, and it will also be seen that the vanes will be maintained in any position to which they may be adjusted, as the metal of which they are constructed should be substantially inert to facilitate the necessary adjustment by bending. Obviously the operation of the device when constructed as indicated in Figs. 8 and 9 will be exactly the same as previously described.

In some instances it is conceivable that it may be desirable to shut off the flow of gaseous fluid through a particular outlet for some reason, and where this is desired, an auxiliary damper may be employed in connection with the grille, or between the control device and the grille. In Figs. 1 and 2, for example, I have shown for illustrative purposes only, a damper, 14, which in this instance is pivotally mounted in rear of the grille, and which is capable of being moved into and maintained in either the open or the closed position. In this instance the damper is mounted on a rock shaft, 15, provided with an arm, 16, connected with a pull rod, 17, provided with notches to engage a stop, 18, at the mouth of the outlet, 11, so as to lock the damper in either the horizontal, open position, in which it is shown in full lines in Figs. 1 and 2, or the vertical, closed position, in which it is shown in dotted lines in Fig. 2. It will be seen, however, that this damper, or any damper which may be used at the outer or delivery end of the outlet, whether in rear of the grille or embodied in the grille, has absolutely no bearing on the operation of the control device hereinbefore described, except that it may control the delivery of the air after it has passed through the control device, and furthermore the adjustment of the damper in no way affects the operation of the control device itself, which, as before stated, is not subject to any further adjustment after the initial adjustment, except to accommodate conditions arising in the general duct system. If the damper, 14, is closed, for example, the air simply ceases to flow through the control device, as it cannot escape from the outlet, but immediately on the opening of the damper the control device functions exactly in accordance with its in situ initial adjustment. The use of a damper in connection with the grille will in many instances be unnecessary and it may be entirely dispensed with without in any way affecting the operation of the control device.

I prefer to have the outer edges of the vanes curved inwardly as shown, for the purpose of assisting in the delivery of the individual currents passing through the apertures, X and X', and eliminating as far as possible any tendency to eddy into the dead spaces between the pairs of vanes which might occur if the outer edges of the vanes were in the same plane as the body of the vanes themselves. I therefore prefer to form these curved portions, 9, so that they constitute in effect segments of a cylinder, with the result that no matter what the angle of the vanes on the opposite sides of an opening, X, may be to each other, the current passing between their outer ends will pass between surfaces curving outwardly from each other in the direction of flow, thus facilitating the gradual expansion of the fluid and the gradual lowering of the velocity, and facilitating the blending of the individual streams.

In Figs. 10 to 15 inclusive, I have illustrated my improved control device applied to an outlet such as an outlet from a duct system, but arranged at or closely adjacent to the delivery aperture of the outlet, so as to discharge separated aspirating streams into the room or space into which the outlet discharges, and spreading the streams laterally beyond the width of the outlet. In these figures the parts corresponding with those shown in Figs. 1 to 7 are given the same reference numerals, with the addition of 200, to avoid repetition.

As will be clearly seen from an examination of Figs. 10 and 12, the control device, which is constructed in the manner previously described, is inserted in the outlet, 211, closely adjacent to its outer end, i. e., its delivery aperture, the individually and independently adjustable vanes, 205, are adjusted so that the delivery openings, indicated at X, between the outer ends of adjacent vanes of contiguous pairs, will effect the desired volume at the desired velocity and in the desired direction to the separated streams, which will in this case be discharged outside of the outlet, and will naturally expand laterally, at the same time gradually losing their velocity as they expand.

It will be noted that there will be a "dead space" or space of low velocity between the high velocity streams adjacent to the separated delivery openings, into which the air of the room or space into which the outlet discharges will be drawn, and will be carried outwardly by the aspirating streams, as indicated by arrows in Fig. 10, for example, so as to facilitate the commingling of the discharged air or gaseous material with that within the room or space. As indicated in Fig. 10, it is desirable in such case to so adjust the vanes that the central delivery aperture will discharge its aspirating stream more or less perpendicularly to the plane of the delivery aperture of the outlet, while the vanes at either side will be so adjusted as to secure a wide lateral distribution of the several aspirating streams, as clearly indicated in Fig. 10. Where a grille is used for appearance sake, it will obviously be desirable, as indicated in Fig. 11, that the fins or blades, 213a, of the grille, 213, shall be disposed at right angles of the vanes of the control device, so that they will not interfere with the lateral distribution and spread of the aspirating streams. As before stated, however, the grille can be omitted altogether, if desired, as it has no effect on the operation of the control device.

It will also be understood that while I have shown the grille vanes both in Fig. 10 and in Fig. 1, disposed vertically in a horizontal outlet, they could be disposed horizontally in a horizontal outlet, or as hereinafter described, horizontally in a vertical outlet, and would produce exactly the same results. If it is desired to employ a damper for closing the entire outlet at times without interfering with the adjustment of the control device, such a damper may be conveniently arranged in rear of the control device, as indicated at 214, in Fig. 12, and operated from the end if desired, by means of the handle, 217, in the manner indicated with respect to Fig. 2, or such damper may be dispersed with altogether.

In Figs. 13, 14 and 15, I have illustrated various adustments of the vanes of the control device, as illustrative of a suitable arrangement where the aspirating effect of the discharged separated air streams may be desired as well as their lateral spreading outside of the outlet. Thus, Fig. 14 shows an arrangement of adjacent vanes located centrally of the control device where it is usually desirable to discharge the air stream substantially perpendicularly to the plane of the delivery aperture of the outlet, while Figs. 13 and 15 illustrate different adjustments for deflecting the air currents to the left and right, respectively. In considering these figures, however, it must be understood that both of the adjacent vanes shown in each figure are capable of independent adjustment with respect to each other, so as to control the volume, velocity and direction, and will remain permanently in their adjusted positions. In Fig. 13 I have illustrated in dotted lines, various positions of the adjacent vanes therein shown, which will illustrate the effect of such adjustments on volume, velocity and direction of the stream passing between them.

Fig. 16 illustrates one embodiment of my invention as applied to the outlet of an individual unit instead of to the outlet of a duct system. In this figure the parts corresponding with those illustrated in Figs. 1 to 7 shall be given the same numerals with the addition of 300, to avoid repetition.

In this figure, 310, represents a unit of any desired type, for example, what is known as a unit of the cabinet type, containing conditioning apparatus indicated generally at 320, which may be heating, cooling, moistening, drying or other conditioning means, or combinations of any or all of the same. The cabinet in this instance has its outlet, indicated at 311, extending across the top of the cabinet and discharging upwardly in this case. My improved control device is therefore disposed horizontally across the outlet, and in this instance is located closely adjacent thereto, so as to discharge separated aspirating streams in the manner previously described, portions of the device being illustrated in section, to show the location and arrangement of the vanes of the control device. The grille, 313, which in this instance extends across the outlet, 311, has its fins or blades, 313a, disposed transversely with respect to the vanes.

The operation of this construction will be just the same as that previously described with reference to Figs. 10 to 15 inclusive, except that the aspirating streams of air will be discharged upwardly and spread laterally instead of being discharged horizontally as herein shown.

If it should be desired, in connection with a unit, for example, to have the entire volume of air discharged substantially uniformly throughout the area of the outlet aperture without spreading, and at substantially uniform velocity, the control device will be located at such a distance back from or below the outlet, 311, as to permit the separated air streams to expand, with reduction of velocity, and mix together before they are discharged from said outlet aperture, as in the arrangement illustrated in Fig. 1, for example.

In all the forms of my invention it will be understood that where a predetermined amount or volume of air is to be continuously delivered through the outlet, this predetermined volume for the entire outlet will be the combined volumes of the separated streams passing between the adjacent vanes of contiguous pairs and the vanes will be initially and permanently adjusted to pass the desired total volume under actual working conditions.

What I claim and desire to secure by Letters Patent is:

1. A permanent outlet control device, comprising a plurality of individually and independently adjustable vanes, arranged in operative relation with a duct outlet with the adjacent vanes coacting to provide separate delivery apertures converging in the direction of the flow of gaseous fluid between such vanes and capable of adjustment in situ by the adjustment of the vanes, to control the volume, direction and velocity of the flow therethrough, and means for supporting and holding the vanes in their adjusted positions.

2. A permanent outlet control device, comprising among its members a frame for fitting an outlet, a plurality of pairs of vanes, pivotally connected adjacent their inner edges to the frame, the adjacent vanes of contiguous pairs converging in the direction of flow of gaseous fluid therebetween to provide separated delivery apertures, each of said vanes of each pair being individually and independently adjustable on its pivotal connection, with respect to an adjacent vane of another pair and with respect to said frame, and means on each of said vanes bearing frictionally against said frame to hold the vanes in their individually adjusted positions.

3. A permanent outlet control device, comprising among its members a frame for fitting an outlet, a plurality of pairs of vanes, pivotally connected adjacent their inner edges to the frame, the adjacent vanes of contiguous pairs converging in the direction of flow of gaseous fluid therebetween to provide separated delivery apertures, each of said vanes of each pair being individually and independently adjustable on its pivotal connection, with respect to an adjacent vane of another pair and with respect to said frame, each of said vanes being provided with a resilient means acting frictionally to secure the vane in its adjusted position.

4. A permanent outlet control device, comprising a frame, slightly smaller than the outlet in which it is to be used, a compressible packing surrounding said frame for holding the frame rigidly in place in the outlet, a plurality of pairs of adjustable vanes, each pair of vanes being supported adjacent to the inner edge of said frame and with their inner edges in close relation to each other, and having their outer edges movable laterally with respect to the frame, and forming separated delivery openings between the outer edges of adjacent vanes of contiguous pairs, the said adjacent vanes of contiguous pairs being independently and individually adjustable with respect to each other to control the volume, direction and velocity of flow therebetween, and being permanently held in their adjusted positions.

5. A permanent outlet control device for the discharge end of an air duct, comprising a frame for fitting an outlet, a plurality of pairs of vanes, having their inner edges secured to said frame in close proximity to each other, and their outer edges projecting in the direction of the air flow through the duct and adapted for relative lateral movement to define between the adjacent vanes of contiguous pairs, separated delivery apertures converging in the direction of the air flow and the vanes on at least one side of said delivery openings being supported at their inner edges and independently adjustable to vary the volume, direction and velocity of relative flows through the individual apertures, and means for securing each of said vanes in its independently adjusted position.

6. A peramenent outlet control device, comprising a frame for fitting an outlet, a plurality of pairs of vanes, having their inner edges secured to said frame in close proximity to each other, and their outer edges capable of being more or less widely separated, separated delivery apertures being formed between the outer edges of adjacent vanes of contiguous pairs, the vanes on at least one side of said delivery openings being pivotally supported at their inner edges and independently adjustable to control the volume, direction and velocity of the flow through said apertures, and means associated with said pivoted vanes for frictionally securing said vanes in their independently adjusted positions.

7. A permanent outlet control device, comprising a frame for fitting an outlet, a plurality of pairs of vanes, having their inner edges secured to said frame in close proximity to each other, and their outer edges capable of being more or less widely separated, delivery apertures being formed between the outer edges of adjacent vanes of contiguous pairs, the vanes on at least one side of said delivery openings being pivotally supported at their inner edges and independently adjustable to control the volume, direction and velocity of the flow through said apertures, the outer edges of each vane being curved in a direction away from the vane on the opposite side of a delivery aperture, to facilitate the gradual expansion of the stream of fluid passing through said aperture and to prevent eddies, and means for permanently securing each of said pivoted vanes in its independently adjusted position.

8. A permanent outlet control device, comprising a frame for fitting an outlet, a plurality of pairs of vanes having their inner edges pivotally supported in said frame in close proximity to each other so as to prevent the passage of gaseous fluid between them and forming delivery apertures between the outer edges of adjacent vanes of contiguous pairs, each vane having its outer edge portion curved in a direction away from the vane on the opposite side of its delivery aperture to facilitate the gradual expansion of the gaseous material flowing through said aperture and prevent eddies, each of said vanes being individually and independently adjustable in situ with respect to the adjacent vanes and frame, each of said vanes being provided with friction flanges extending substantially perpendicularly with respect to the vanes for frictionally engaging adjacent portions of the frame and permanently securing each vane in its independently adjusted position.

9. A permanent outlet control device, comprising a frame for fitting an outlet, a plurality of pairs of vanes formed of material capable of being bent, supports rigidly connected to said vanes adjacent to their inner edges, and rigidly connected with the frame, the vanes of each pair having their inner edges in close proximity and their outer portions diverging outwardly, to form separated delivery apertures between the adjacent vanes of contiguous pairs, said vanes being capable of being individually and independently adjusted laterally by bending them with respect to said supports, and being held rigidly and permanently in their adjusted positions by their rigid connections with said supports.

10. In combination with a duct through which air is forced, a frame slightly smaller than and corresponding in cross-sectional shape to the interior of said duct, a compressible packing around the periphery of said frame for frictionally holding the frame in place in said duct while permitting removal and replacement thereof as a unit, and a plurality of damper vanes supported by said frame and adjustable relative thereto to vary the area of the passageway through said frame.

11. In a system for distributing air to the room of a building, the combination of an outlet duct, a grille covering the outlet end of said duct, damper means located in said duct behind said grille and adjustable to control the volume of air discharged therethrough, and a plurality of individually adjustable damper vanes disposed in said duct behind said first mentioned damper means and spaced across the duct, said vanes cooperating to define a multiplicity of passageways individually adjustable to maintain a substantially uniform distribution of the air flow across said duct.

12. In a system for distributing air to the room of a building, the combination of an air duct extending generally parallel to a wall of said room, an outlet duct communicating with said first duct and extending at an angle relative thereto through said wall, and means mounted adjacent the junction of said first duct and outlet duct for effecting substantially uniform distribution of the air flow through said outlet duct comprising a multiplicity of damper members mounted to swing on axes extending transversely of the direction of air flow through said first duct and spaced laterally across said outlet duct in the direction of such flow, said members being adjustable individually about their axes whereby to enable the widths of the passageways between the adjacent damper members and between the terminal members and the sides of said outlet duct to be varied individually.

13. In a system for distributing air to the room of a building, the combination of a main air duct extending generally parallel to a wall of said room, a branch duct communicating with said main duct intermediate the ends thereof and extending through said wall, a plurality of individually adjustable damper vanes disposed within and spaced from the discharge end of said branch duct and defining a multiplicity of passages spaced across said branch duct in the direction of the air flow through said main duct, the passages on the downstream side of said branch duct being of narrower width than those on the opposite side, and said passages being spaced remotely from said discharge end to allow for expansion of the air flowing through said passages to a susbtantially uniform velocity before discharge thereof from said end.

14. In a system for distributing air to the room of a building, the combination of a first air duct extending generally parallel to a wall of said room, an outlet duct communicating with said first duct and extending through said wall, and a multiplicity of damper members mounted in said outlet duct remote from the discharge end thereof to swing on axes extending transversely of the direction of air flow through said first duct and spaced laterally across said outlet duct, said members being adjustable individually about their axes whereby to enable the widths of the passageways between the adjacent damper members and between the terminals members and the sides of said outlet duct to be varied individually.

15. A device for controlling the discharge of an air current into a room from an air duct branching from a main supply conduit, said device comprising a frame fitting in said duct, and a plurality of pairs of vanes spaced across said duct and each having their inner edges fastened in said frame closely adjacent each other and their outer edges projecting in the direction of the air flow through said duct, the outer ends of the vanes on at least one side of the openings defined by the adjacent vanes of contiguous pairs being independently adjustable to vary the direction and volume of relative air flow through the different openings whereby to enable the distribution of the air current across the end of said duct to be controlled or equalized.

CORTLAND N. O'DAY.